US006624618B2

(12) United States Patent
Kernahan et al.

(10) Patent No.: US 6,624,618 B2
(45) Date of Patent: Sep. 23, 2003

(54) SYSTEM AND METHOD FOR VEHICLE VOLTAGE REGULATION

(75) Inventors: Andrew James Kernahan, Canton, MI (US); David Chronowski, Harrison Township, MI (US); Mark Allen Halseth, Saline, MI (US); Roger William Maynard, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 34 days.

(21) Appl. No.: 09/769,026

(22) Filed: Jan. 25, 2001

(65) Prior Publication Data

US 2002/0097026 A1 Jul. 25, 2002

(51) Int. Cl.⁷ .......... H02P 15/00; H02P 3/00; H02P 9/06; H02P 11/00; H02P 9/00; H02H 7/06
(52) U.S. Cl. .......... 322/90; 322/22; 322/11; 322/28
(58) Field of Search .......... 322/28, 90, 11, 322/22; 318/139

(56) References Cited

U.S. PATENT DOCUMENTS

| | | | |
|---|---|---|---|
| 4,308,492 A | 12/1981 | Mori et al. | |
| 4,310,793 A * | 1/1982 | Sheldrake et al. | 320/152 |
| 4,661,760 A | 4/1987 | Goto et al. | |
| 5,416,402 A | 5/1995 | Reher et al. | |
| 5,488,283 A | 1/1996 | Dougherty et al. | |
| 5,549,984 A | 8/1996 | Dougherty | |
| 5,681,495 A * | 10/1997 | Tsuchiya et al. | 123/142.5 R |
| 5,711,605 A | 1/1998 | Reher et al. | |
| 5,867,009 A * | 2/1999 | Kiuchi et al. | 180/165 |
| 5,994,787 A * | 11/1999 | Hibino | 219/205 |
| 6,018,234 A * | 1/2000 | de Savasse | 320/153 |
| 6,037,690 A * | 3/2000 | Hill | 310/168 |
| 6,049,198 A | 4/2000 | Schenk | |
| 6,057,666 A | 5/2000 | Dougherty et al. | |
| 6,184,661 B1 * | 2/2001 | Becker et al. | 322/25 |
| 6,275,012 B1 * | 8/2001 | Jabaji | 322/22 |
| 6,314,918 B1 * | 11/2001 | McFarland et al. | 123/3 |
| 6,331,762 B1 * | 12/2001 | Bertness | 320/134 |

FOREIGN PATENT DOCUMENTS

GB 1207983 10/1970

* cited by examiner

*Primary Examiner*—Joseph Waks
*Assistant Examiner*—Julio C. Gonzalez
(74) *Attorney, Agent, or Firm*—Carlos L. Hanze

(57) ABSTRACT

A method of operating an alternator of a motor vehicle includes the steps of monitoring an amount of stored electrical energy available to operate the vehicle, estimating a vehicle electrical load, and regulating an output of the alternator based at least in part on the amount of electrical energy available to the vehicle and the estimated vehicle electrical load.

21 Claims, 5 Drawing Sheets

| | Load Level 1<br><50A | Load Level 2<br>50 - 100A | Load Level 3<br>>100A |
|---|---|---|---|
| Summer Scenario | Base Loads | Base Loads<br>Headlamps<br>Brake Lights | Base Loads<br>Headlamps<br>Engine Cooling Fans<br>A/C Clutch<br>A/C Blower Front High<br>A/C Blower Rear High |
| Winter Scenario | Base Loads<br>Heater Blower Front Low<br>Brakelights | Base Loads<br>Heater Blower Front High<br>Heater Blower Rear High | Base Loads<br>Headlamps High Beam<br>Brakelights<br>Heated Backlight<br>Heated Blower Front High<br>Heated Blower Rear High<br>Heated Seats High |

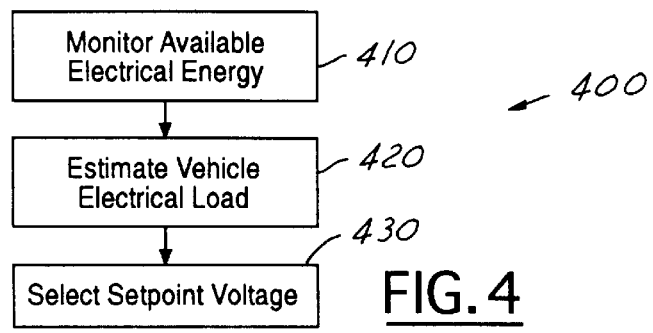
FIG. 4
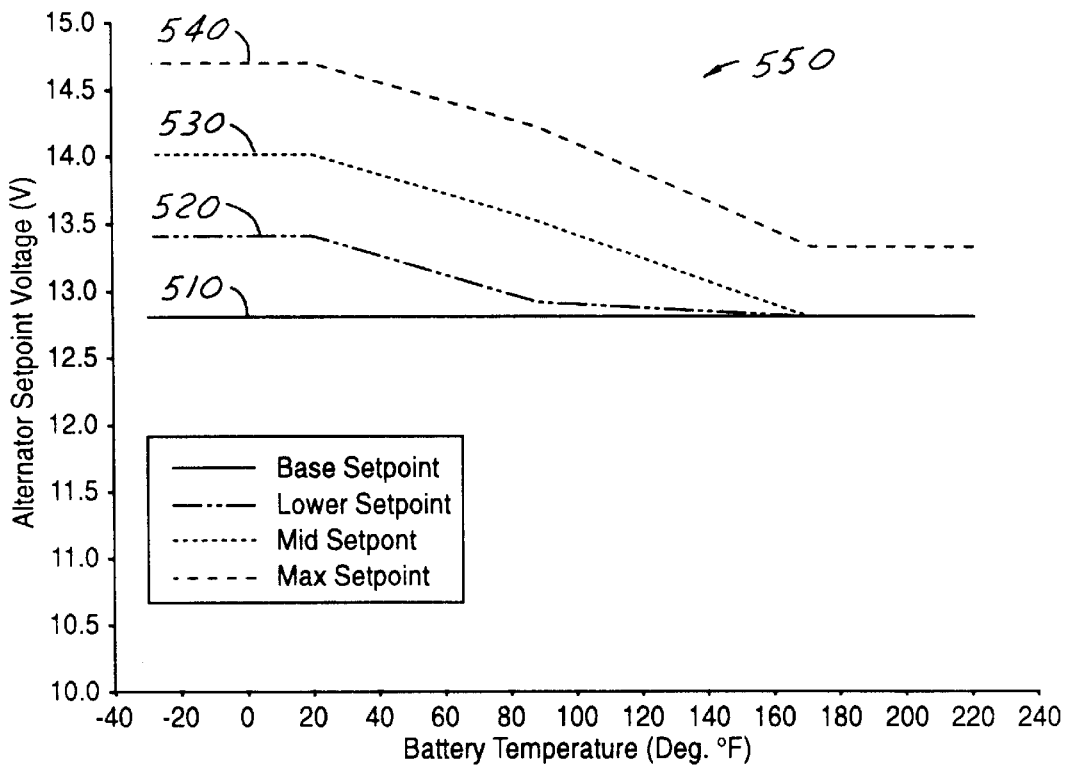
FIG. 5A
FIG. 5B

| 702 VEHICLE FUNCTION | APPROXIMATE LOAD CURRENTS (Amps) 704 |
|---|---|
| Electronic Cooling Fan Low | 26.22 |
| Electronic Cooling Fan High | 38.66 |
| Exterior Lights | 4.80 |
| Low Beam Headlights | 8.40 |
| High Beam Headlights | 1.70 |
| AC Blower High | 34.28 |
| AC Blower Medium/High | 27.98 |
| AC Blower Medium | 23.18 |
| AC Blower Low | 19.28 |
| Heater Blower High | 29.6 |
| Heater Blower Medium/High | 25.00 |
| Heater Blower Medium | 21.00 |
| Heater Blower Low | 17.7 |
| Rear Defroster | 19.58 |

FIG. 7

| | Load Level 1 < 50A | Load Level 2 50 - 100A | Load Level 3 >100A |
|---|---|---|---|
| Summer Scenario | Base Loads | Base Loads<br>Headlamps<br>Brake Lights | Base Loads<br>Headlamps<br>Engine Cooling Fans<br>A/C Clutch<br>A/C Blower Front High<br>A/C Blower Rear High |
| Winter Scenario | Base Loads<br>Heater Blower Front Low<br>Brakelights | Base Loads<br>Heater Blower Front High<br>Heater Blower Rear High | Base Loads<br>Headlamps High Beam<br>Brakelights<br>Heated Backlight<br>Heated Blower Front High<br>Heated Blower Rear High<br>Heated Seats High |

FIG. 8

SYSTEM AND METHOD FOR VEHICLE VOLTAGE REGULATION

BACKGROUND OF THE INVENTION

1. Field of the Invention

The present invention relates generally to a system for regulating the output of a vehicle alternator. More particularly, the invention relates to a method and system for optimizing the output of the vehicle alternator so as to minimize vehicle fuel consumption.

2. Background Art

Alternators are used in conventional motor vehicles to convert mechanical energy produced by the vehicle's internal combustion engine to electrical energy. Alternating current (AC) generated by the alternator's rotating shaft is converted to direct current (DC), which in turn is used to power vehicle electrical circuits during normal driving conditions and to charge the vehicle's battery.

In order to protect and properly operate the electrical circuits and charge the battery, the amount of charge or current provided by the alternator must be properly regulated. Accordingly, conventional regulating devices have been developed to maintain the DC alternator output voltage, or "setpoint," within a nominal range, typically 12 to 15 volts. Conventional regulating devices, as disclosed for example in U.S. Pat. Nos. 5,711,605 and 6,018,234, use either inferred or actual battery temperatures to regulate the alternator voltage output.

A problem with conventional devices however is that corresponding regulation strategies are not tunable or adaptable to changing load demands of the vehicle. As such, an appreciable amount of mechanical energy is often converted to excess electrical energy, and thus energy is lost that can otherwise be used to drive or power other vehicle systems or components. The expended mechanical energy is most basically in the form of engine torque, which in turn requires a greater expenditure of fuel to satisfy the artificially high electrical loads of the vehicle.

In addition, mechanical energy is also lost in the form of heat due to the unnecessary charging of the vehicle battery at higher voltage levels than what is actually required. Increased heat losses translate into decreased efficiency and thus further increased fuel consumption. Damage to the battery can also occur under such conditions due to battery gassing.

Further, because more fuel is burned, an increased amount of engine exhaust is generated requiring addition emissions control measures.

Accordingly, the inventors herein have recognized the need to provide an improved system and method for regulating the output of a vehicle alternator so as to minimize vehicle fuel consumption and emissions and reduce the risk of damage to the vehicle battery.

SUMMARY OF THE INVENTION

The aforedescribed limitations of conventional voltage regulation methods and systems are substantially overcome by the present invention, in which a method for operating an alternator of a motor vehicle is provided. The method includes the steps of monitoring an amount of stored electrical energy available to operate the vehicle, estimating a vehicle electrical load, and regulating an output of the alternator based at least in part on the amount of electrical energy available to the vehicle and the estimated vehicle electrical load. Preferably, the alternator setpoint voltage is regulated based on a measured battery state of charge and the estimated electrical load of the vehicle.

A corresponding system for operating an alternator of a motor vehicle is also disclosed. The system includes a first monitor for indicating the amount of stored electrical energy available to operate the vehicle, a second monitor for indicating operation of vehicle electrical components, and a controller coupled to the first and second monitors for estimating a vehicle electrical load based on operation of the vehicle electrical components and for regulating an output of the alternator based at least in part on the indicated amount of stored electrical energy and the estimated vehicle electrical load.

An advantage of the above-described method and system is that the alternator output can be regulated so as to minimize vehicle fuel consumption. For example, by taking into account the battery state of charge and the electrical energy required by the vehicle at any given time, an alternator setpoint voltage can be optimized so as to more closely track the electrical load requirements of the vehicle and thus minimize the amount of excess electrical energy generated. By optimizing the setpoint, based at least in part on the amount of stored electrical energy and estimated vehicle load, mechanical energy otherwise used to produce excess electrical energy is conserved and used for other purposes thereby providing a fuel economy gain when operating the vehicle.

Further objects, features and advantages of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein:

FIG. 4 is a flow diagram of a preferred method for operating a vehicle alternator in accordance with the present invention;

FIGS. 5A and 5B show alternator setpoint regulation classifications and strategies, respectively, in accordance with a preferred embodiment of the present invention;

FIG. 7 is an exemplary table of various vehicle functions and vehicle loads in accordance with the present invention; and FIG. 8 an exemplary table of various vehicle load levels and operational scenarios in accordance with the present invention.

DETAILED DESCRIPTION OF THE PREFERRED EMBODIMENTS

Figure 1:
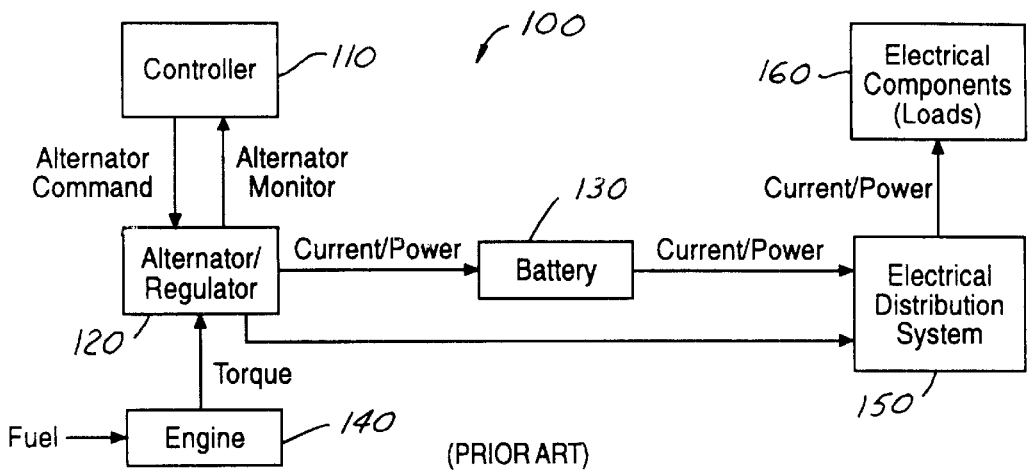
FIG. 1 is a schematic diagram of a conventional system for operating a vehicle alternator.

FIG. 1 shows a schematic diagram of a conventional vehicle voltage regulation system and is described herein in detail for a better understanding of the present invention. The system includes an engine 140, an engine or powertrain controller 110, an alternator/voltage regulator 120, a battery 130, an electrical distribution system 150 and a plurality of vehicle electrical components 160. As known and understood in the art, the alternator 120 produces an alternating current (AC), which in turn is converted to a direct current (DC) via a rectifier circuit to operate the vehicle electrical components 160 and charge the battery 130. The battery 130 provides electrical power when the vehicle's engine or primary power source is not running, and also when the required electrical load cannot be fully satisfied by the alternator alone. Such a situation often arises, for example, when the engine is idling and several "large" electrical components are operating at once.

Figure 2:
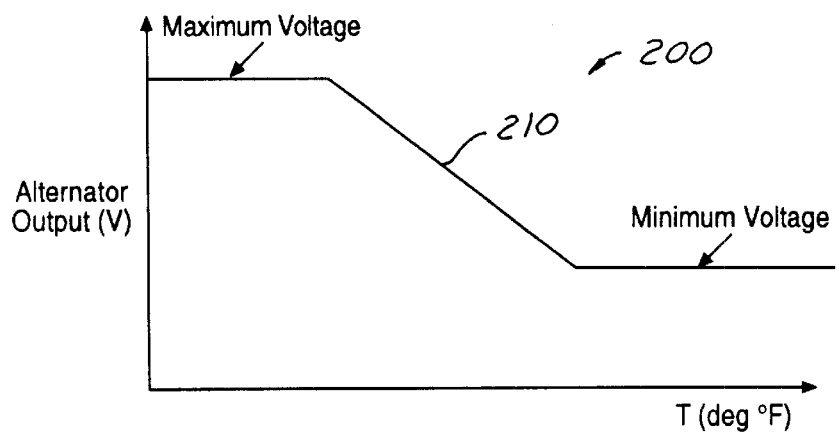
FIG. 2 is a plot of alternator setpoint voltage versus battery temperature in accordance with the prior art system of FIG. 1.

A regulator circuit is further provided, usually as part of the alternator 120, to control the alternator voltage output or "setpoint" voltage so as to prevent battery overcharging and damage to other vehicle electrical components. Accordingly, the alternator setpoint voltage is selected to coincide with the charging and output characteristics of the vehicle battery 130. For lead-acid batteries, for example, the charging profile is usually a linear function of the battery temperature as qualitatively shown by the curve 210 of FIG. 2. As shown, the maximum alternator setpoint voltage is selected to be within the operational limits of one or more of the vehicle electrical components, while the minimum setpoint voltage is selected to coincide with the discharge voltage of the battery 130. In between, in order to accommodate the chemical processes of the battery and to prevent so-called "gassing", the alternator setpoint is regulated as a function of the battery temperature, either actual or inferred, as shown in FIG. 2 to optimize the performance and longevity of the battery.

Referring again to FIG. 1, when the engine is running and the vehicle electrical load is low, the alternator's output is regulated or maintained at a maximum value while the battery is charged. In such a case, the difference between the alternator output and the required vehicle load will be used for battery charging. At lower engine speeds, or higher vehicle electrical loads, the alternator is out of regulation and the battery is discharged.

Figure 3:
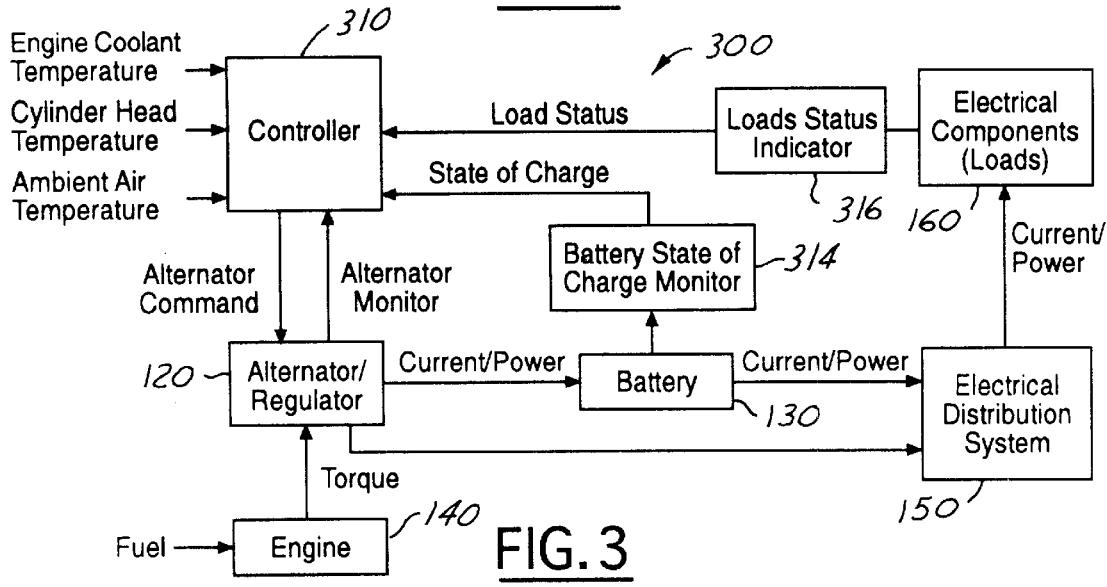
FIG. 3 is a schematic diagram of a system for operating a vehicle alternator in accordance with a preferred embodiment of the present invention.

FIG. 3 shows a schematic diagram of a system for operating a vehicle alternator in accordance with a preferred embodiment of the present invention. The system is similar to the system shown in FIG. 1, but in addition includes a battery state of charge (SOC) monitor 314 and a load status indicator 316 in communication with the a controller 310. The battery SOC monitor 314, which can be any suitable circuit or means known in the art for measuring battery SOC, provides an indication of battery SOC to the controller 310. The battery SOC monitor can be physically part of the controller, or "stand alone" monitor having hardware and/or software components separate and apart from the controller 310. The load status indicator 314 can be any suitable means for indicating vehicle load status information to the controller 310. In a preferred embodiment, the indicator 314 includes electronic means for communicating Standard Corporate Protocol (SCP) data messages indicating the "ON", "OFF", "LOW", "HIGH", "STANDBY" or other status information indicative of vehicle electrical load.

The controller 310 monitors the operation of the alternator and generates an alternator setpoint control signal in accordance with the methods of FIGS. 4 and 6A/6B described below. The controller 310, which can be any suitable powertrain controller or separate microprocessor-based module, includes a central processing unit (CPU), corresponding input/output ports, read-only memory (ROM) or equivalent electronic storage medium containing processor-executable instructions and database values, random-access memory (RAM), and a data bus of any suitable configuration. In accordance with the present invention, the controller 310 receives a variety of other signals from various sensors coupled to the engine and/or the vehicle, including but not limited to signals indicating engine coolant temperature, cylinder head temperature and ambient air temperature.

The controller 310 further includes computer program code for estimating actual and/or scheduled vehicle electrical load. In a preferred embodiment, the controller 310 uses the load status information provided by indicator 316, a mapping of vehicle functions and vehicle loads as shown in FIG. 7 and a summing means to derive the vehicle electrical load. The controller 310 also includes computer program code for deriving an inferred battery temperature based on the sensed engine coolant temperature, ambient air temperature and cylinder head temperature. The inferred battery temperature is in turned used to derive the maximum alternator setpoint voltage as shown by curve 540 in FIG. 5B. Alternatively, a temperature sensor can be provided for measuring an actual battery temperature.

FIG. 4 shows a flow diagram of a preferred method 400 for operating a vehicle alternator in accordance with the present invention. The method, which is embodied in computer program code resident in the controller, includes the steps of monitoring an amount of stored electrical energy available to operate the vehicle, step 410, estimating a vehicle electrical load, step 420, and selecting an output of the alternator based at least in part on the amount of electrical energy available to the vehicle and the estimated vehicle electrical load, step 430. Preferably, the alternator setpoint is selected via an appropriate control signal generated by the controller based at least in part on a measured battery SOC and an estimated vehicle electrical load. The estimated vehicle electrical load can include values for actual and/or scheduled loads.

FIG. 5A shows various setpoint "regulation classifications" in accordance with a preferred embodiment of the present invention. The present system can be characterized by a multiplicity of regulation classifications, for example the "base", "low", "medium" and "high" shown in FIG. 5A, and the scope thereof is not limited by the exemplary classifications described herein. The regulation classifications are determined as a function of battery SOC and estimated vehicle load, wherein three SOC levels and three vehicle load levels are defined. As shown, again by way of example only, $SOC_1$ corresponds to monitored SOC values greater than 90% (as measured in Amp-Hours), $SOC_2$ to values between 50 and 90%, and $SOC_3$ to values greater less than 50%. Load Levels 1 through 3 correspond to estimated vehicle loads of less than 50 A, 50 to 100 A, and greater than 100 A, respectively. Each of the regulation classifications are preferably stored in computer memory, for example via a look-up table, and used by the controller to implement the regulation strategies described below with reference to FIG. 5B.

FIG. 5B shows alternator setpoint voltage "regulation strategies" corresponding to the voltage regulation classifications described with reference to FIG. 5A. Based at least in part on the measured battery SOC and an estimated vehicle load, the system of FIG. 3 is operated in accordance with a plurality of setpoint voltage/battery temperature curves as shown for example in FIG. 5B. In addition, the system of FIG. 3 can be operated based on the existence of one or more "premium" vehicle loads. The present system can be characterized by any number of regulation strategies, and the scope thereof is not limited by the exemplary strategies described herein. Transitions between regulation strategies can be performed, for example, by using a transition voltage for switching between voltage/battery curves.

Each of the regulation strategies are preferably stored in computer memory in the form of a look-up table, and can be used by the controller to set optimal alternator setpoint voltages as a function of battery SOC and vehicle electrical load.

Multiple setpoint voltage/battery temperature curves are provided in accordance with a preferred embodiment of the present invention. Curve 510, for example, represents an upper bound of "base" setpoints corresponding to the operation of "base" or "nominal" vehicle electrical components or loads. Such "base" loads may include electrical loads for critical vehicle components such as the engine controller and vehicle lighting or safety systems. As shown in FIG. 8, operation "base" loads alone may correspond to Load Level 1 operation during summertime (Summer Scenario), or as only part of Load Level 1 operation during wintertime (Winter Scenario).

Referring again to FIG. 5B, curve 520 represents an upper bound of "low" setpoints, which for example as shown FIG. 8, may include solely "base" loads during summertime, or "base" loads plus additional critical loads such as brake light and front heater loads during wintertime. Curve 530 represents an upper bound of "medium" setpoints, wherein base, headlamp and brake light loads are required during summertime, and wherein the base and heater loads are required during wintertime. Curve 540 represents an upper bound of "high" setpoints, wherein base, headlamp, cooling fan and air conditioning loads are required during summertime, and wherein base, headlamp high beam, brake light, heated backlight, heater and heated seat loads are required during wintertime. Preferably, curve 540 is determined as described above based on the measured engine coolant, ambient air and cylinder head temperatures.

Figure 6A:
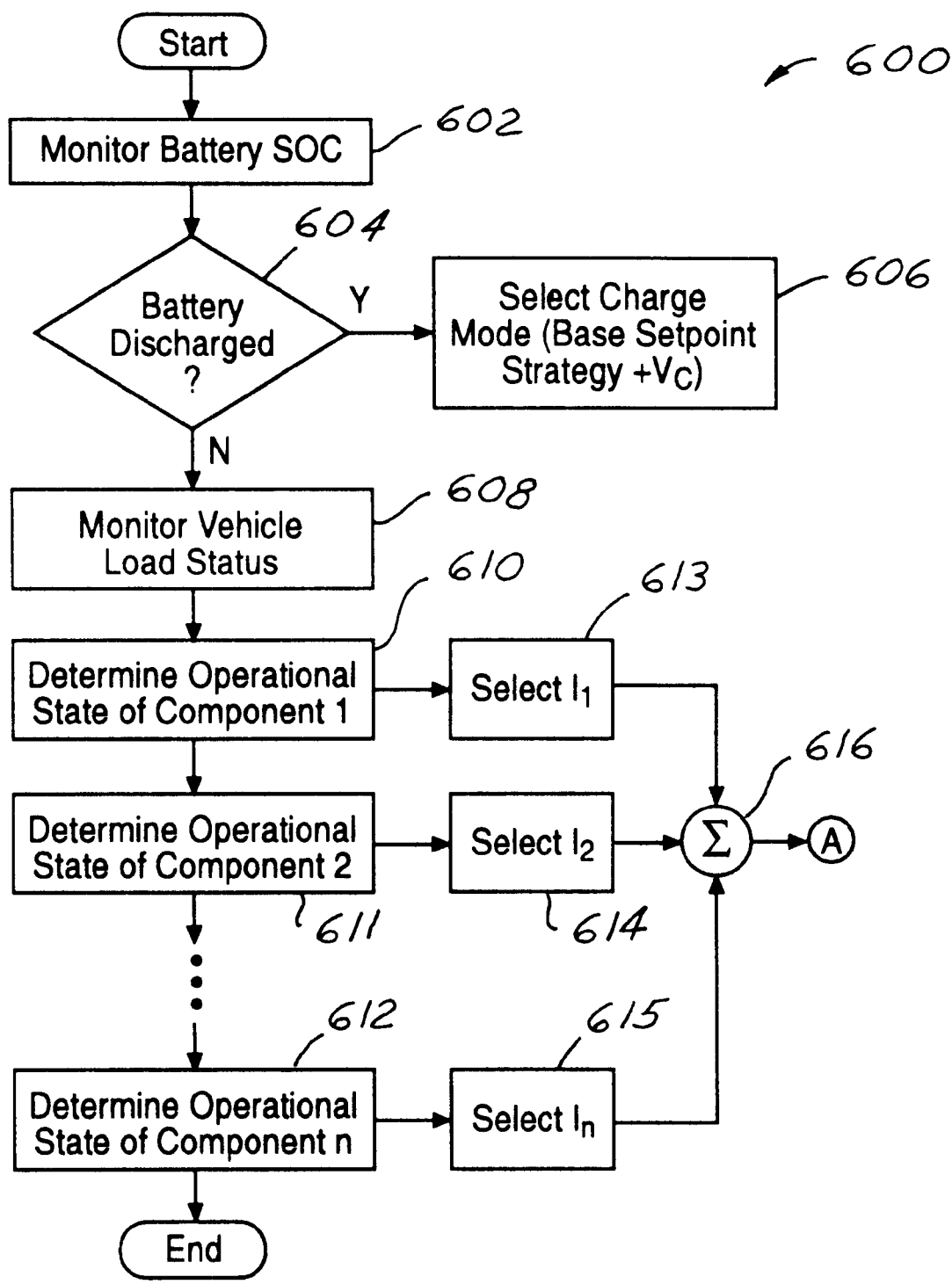
FIGS. 6A and 6B are detailed flow diagrams of the method shown in FIG. 4.
Figure 6B:
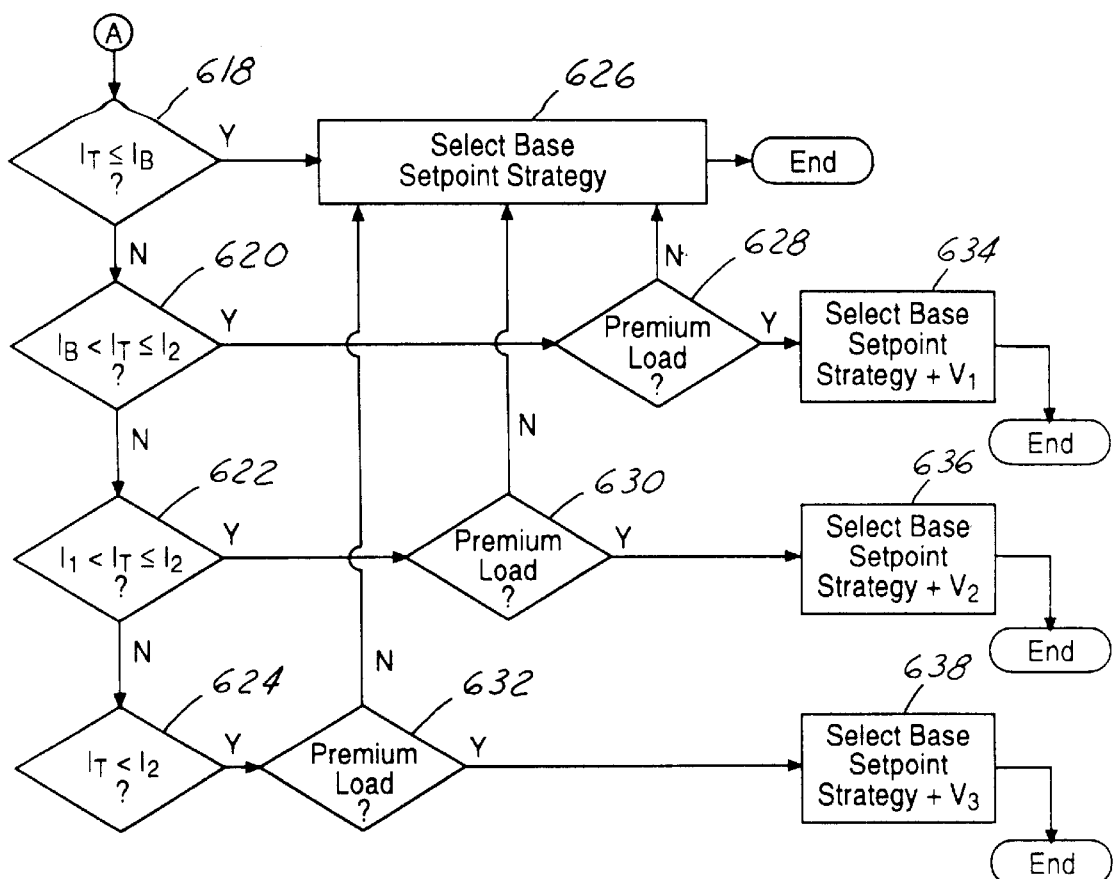

FIGS. 6A and 6B show a detailed flow diagram of the method shown in FIG. 4. As shown in FIG. 6A, the battery is first monitored using any suitable means to determine the battery SOC, step 602. If the battery SOC is to be determined to be a predetermined minimum threshold corresponding to a "discharged" state of the battery, step 604, then the controller selects a "charge" regulation strategy whereby the alternator setpoint is selected to be a maximum, step 606. The charge mode may for example correspond to curve 540 shown in FIG. 5, i.e., a base load plus and charging voltage $V_c$. The charging voltage $V_c$ is nominally selected to allow operation of a subset of electrical components while providing a sufficient level of charging current to the battery.

Referring again to FIG. 6A, if the battery is not discharged in accordance with step 604, then the vehicle load status is monitored, step 608. Preferably, using SCP or other equivalent communications protocol and data links, selected electrical components (loads) are monitored to determine whether such components are on, off or in some other designated operational power state. Accordingly, per steps 610 through 615 and a look-up table as shown in FIG. 7, the operational power states of the electrical components are mapped to corresponding current load values $I_1$ through $I_n$. Each of these individual load values $I_1$ through $I_n$ are then summed in accordance with step 616 to obtain an estimated vehicle electrical load $I_T$. Optionally, the method can be modified to provide load values based on scheduled operation of designated vehicle electrical components.

Referring now to FIG. 6B, the estimated vehicle load $I_T$ is compared to a predetermined threshold $I_B$ corresponding to "base" load operation, step 618. If $I_T$ is less than or equal to the threshold value $I_B$, then a base setpoint strategy is selected via a corresponding look-up table, step 626. A base load strategy, for example, is shown by curve 510 of FIG. 5.

If $I_T$ however is greater than $I_B$, then comparisons 620, 622 and 624 are made as required to determine whether $I_T$ is within any number of predetermined ranges corresponding for example to Load Levels 1–3 as described above. If $I_T$ is determined to be within any of the predetermined ranges, then steps 628, 630 and 632 are performed to determine whether "premium" loads are active. "Premium" loads can be defined as desired, and for example, may include loads corresponding to operation of user-perceivable components such as headlamps, heater blowers, fog lamps, wipers, interior lights, etc. If premium loads are active, then corresponding setpoint strategies are selected depending on the value of $I_T$, steps 634, 636 and 638. Generally, if premium loads are active, additional margins $V_1$, $V_2$ and $V_3$ help ensure that the user does not notice any difference in voltage levels, e.g., dimming of interior lights and headlamps. If the premium loads are not active, then the base setpoint strategy is selected and the battery is allowed to discharge. As such, the use of various setpoint regulation strategies is imperceptible to a user.

Alternatively, a setpoint transition strategy can be used to transition between the various setpoint regulation strategies. The transition strategy, which is nominally a "soft start" or ramping voltage function, is used to more gradually transition the alternator output between regulation strategies. The ramping voltage thus minimizes rapid changes in the alternator output that may effect operation and diminish performance of vehicle electrical components.

Thus, a method has been described that allows a vehicle alternator to be operated efficiently in accordance with any number of optimal regulation strategies. Preferably, selection of the optimal regulation strategy depends on the battery SOC, the magnitude of active electrical loads, and the criticality of the active loads. By optimizing the setpoint, energy otherwise used to produce excess electrical power is conserved.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method for operating an alternator of a motor vehicle, the alternator having a controllable output, the method comprising:

monitoring an amount of stored electrical energy available to operate the vehicle;

estimating a vehicle electrical load;

generating an alternator setpoint control signal based at least in part on the amount of electrical energy available to the vehicle and the estimated electrical load of the vehicle; and using the setpoint control signal to control the alternator output so as to track the electrical load requirements of the vehicle and minimize the amount of excess electrical energy generated by the alternator, and deriving a schedule of operation of vehicle electrical components; and estimating the vehicle electrical load based on the scheduled operation of the vehicle components.

2. The method according to claim 1, further comprising the steps of:

monitoring operation of vehicle electrical components; and estimating the vehicle electrical load based on the monitored operation of the vehicle components.

3. The method according to claim 1, wherein said monitoring step comprises the step of monitoring a battery state of charge.

4. The method according to claim 3, wherein said regulating step comprises selecting an alternator setpoint voltage based on at least in part on the battery state of charge and the estimated vehicle electrical load.

5. The method according to claim 4, wherein said step of selecting an alternator voltage comprises:
   deriving a plurality of voltage regulation classifications; and
   selecting one of a plurality of voltage regulation strategies corresponding to the voltage regulation classifications.

6. The method according to claim 5, further comprising the step of providing a battery temperature, and further wherein each of the voltage regulation strategies are a function of battery temperature.

7. The method according to claim 5, further comprising the steps of:
   monitoring operation of critical vehicle loads; and
   selecting one of said voltage regulation strategies based at least in part on the operation of the critical vehicle loads.

8. The method according to claim 5, further comprising the step of selecting a setpoint transition strategy to transition operation between the voltage regulation strategies.

9. A method for operating an alternator of a motor vehicle having a battery coupled to the alternator for storing electrical energy, the alternator having a controllable output, the method comprising:
   monitoring a battery state of charge;
   monitoring operation of vehicle electrical components;
   estimating a vehicle electrical load based on the operation of the vehicle components;
   generating an alternator setpoint control signal based at least in part on the battery state of charge and the estimated vehicle electrical load; and
   using the setpoint control signal to control the alternator output so as to track the electrical load requirements of the vehicle and minimize the amount of excess electrical energy generated by the alternator,
   wherein said regulating step comprises selecting an alternator setpoint voltage based at least in part on the battery state of charge and the estimated vehicle electrical load; and
   deriving a plurality of voltage regulation classifications; and
   selecting one of a plurality of voltage regulation strategies corresponding to the voltage regulation classifications.

10. The method according to claim 9, further comprising the step of providing a battery temperature, and further wherein each of the voltage regulation strategies are a function of battery temperature.

11. The method according to claim 9, further comprising the steps of:
    monitoring operation of critical vehicle loads; and
    selecting one of said voltage regulation strategies based at least in part on the operation of the critical vehicle loads.

12. The method according to claim 9, further comprising the step of selecting a setpoint transition strategy to transition operation between the voltage regulation strategies.

13. A system for operating an alternator of a motor vehicle, the alternator having a controllable output, the system comprising:
    a first monitor for indicating an amount of stored electrical energy available to operate the vehicle;
    a second monitor for indicating operation of vehicle electrical components; and
    a controller coupled to the first and second monitors for estimating a vehicle electrical load based on operation of vehicle electrical components, generating an alternator setpoint control signal based at least in part on the indicated amount of stored electrical energy and the estimated vehicle electrical load, and using the setpoint control signal to control the alternator output so as to track the electrical load requirements of the vehicle and minimize the amount of excess electrical energy generated by the alternator,
    means for deriving a schedule of operation of the vehicle electrical components; and
    means for estimating the vehicle electrical load based on the scheduled operation of the vehicle components.

14. The system according to claim 13, wherein said first monitor comprises a battery state of charge monitor.

15. The system according to claim 13, wherein said second monitor comprises means coupled to the vehicle electrical components for communicating information indicative of vehicle electrical load.

16. The system according to claim 13, wherein said controller comprises:
    means for monitoring operation of the vehicle electrical components; and
    means for estimating the vehicle electrical load based on the operation of the vehicle components.

17. The system according to claim 13, wherein said controller comprises means for selecting an alternator setpoint voltage based on the amount of electrical energy available to operate the vehicle and the estimated vehicle electrical load.

18. The system according to claim 17, wherein said controller comprises:
    means for deriving a plurality of voltage regulation classifications; and
    means for selecting one of a plurality of voltage regulation strategies corresponding to the voltage regulation classifications.

19. The system according to claim 18, further comprising a sensor for providing a battery temperature and further wherein each of the voltage regulation strategies are a function of battery temperature.

20. The method according to claim 1, further comprising the steps:
    obtaining information indicative of vehicle electrical load;
    communicating the vehicle load information to a controller;
    estimating the vehicle electrical load using the vehicle load information communicated to the controller.

21. The system according to claim 13, wherein said controller comprises:
    means for selecting a plurality of alternator voltage regulation strategies based at least in part on the stored amount of electrical energy available to operate the vehicle and the estimated vehicle load; and
    means for selecting a setpoint transition strategy to transition alternator operation between the voltage regulation strategies.

* * * * *